Jan. 9, 1934.  G. L. JESSUP  1,942,758

ELECTRIC HEATER

Filed May 4, 1932  2 Sheets-Sheet 1

Inventor
G. L. Jessup
By Philip A. T. Terrell
Attorney

Jan. 9, 1934.  G. L. JESSUP  1,942,758
ELECTRIC HEATER
Filed May 4, 1932  2 Sheets-Sheet 2
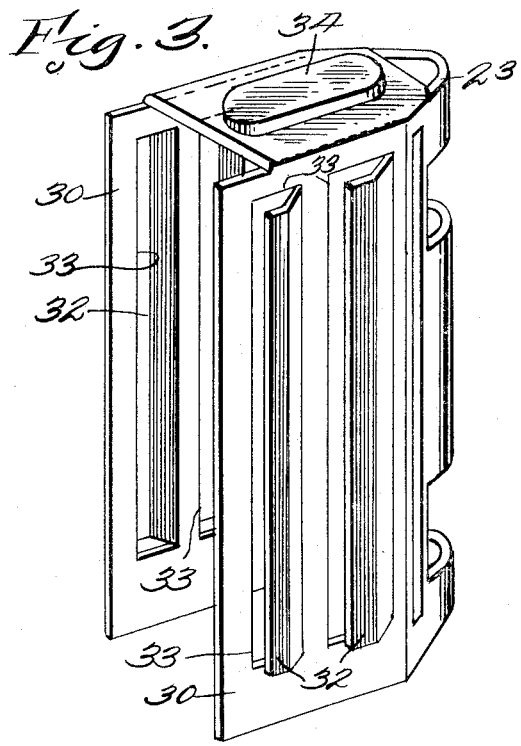
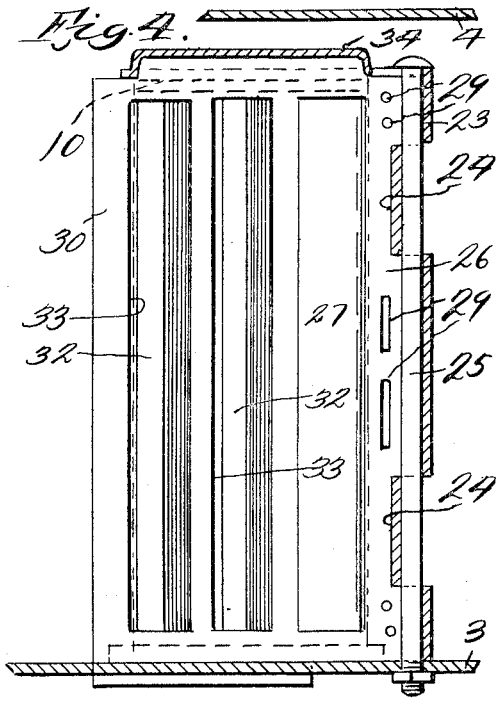
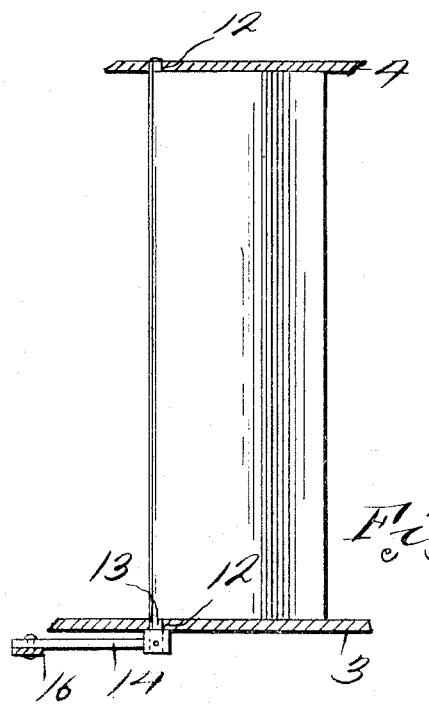
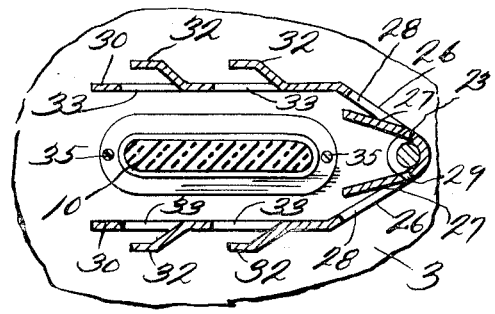
Inventor
G. L. Jessup Patented Jan. 9, 1934

1,942,758

UNITED STATES PATENT OFFICE 1,942,758

ELECTRIC HEATER

George Leroy Jessup, Woodland, Calif.

Application May 4, 1932. Serial No. 609,311

6 Claims. (Cl. 219—39)

The invention relates to electric heating devices, and has for its object to provide a device of this character comprising a casing flared in shape, and having a fan in the small end thereof and positioned to direct air currents on heating elements in the large portion of the casing.

A further object is to provide a plurality of dampers rearwardly of the heating elements and forming means whereby the amount of air allowed to come in contact with the heating elements may be regulated and varied.

A further object is to provide shields around the heating elements and arching the rear sides thereof and provided with openings through which air current may pass, said shields preventing the too rapid cooling of the rear sides of the heating elements.

A further object is to provide the casing with air ports interposed between the heating elements and the dampers and forming means whereby a circulation of air will take place over the heating elements when the dampers are closed and the fan is stopped.

A further object is to provide a plurality of series of dampers vertically and pivotally mounted and lever means in connection with said dampers whereby, through a single operation, each series of dampers will be moved to closed and open positions, moving in opposite directions.

A further object is to form the shields for the heating elements from sheet metal having outwardly struck vanes at opposite sides for deflecting heated air forwardly as it leaves the shields.

A further object is to provide struck-in vanes at the rear V-shaped sides of the shields for admitting air within the shields through the vane apertures and for deflecting said air to the sides of the heating elements for preventing a too rapid cooling of the inner sides of the heating element.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 3 is a perspective view of one of the shields.

Figure 4 is a vertical longitudinal sectional view through one of the shields.

Figure 5 is a horizontal sectional view through one of the heating elements and shields.

Figure 6 is a vertical sectional view through a portion of the casing, showing one of the dampers in elevation.

Figure 1:
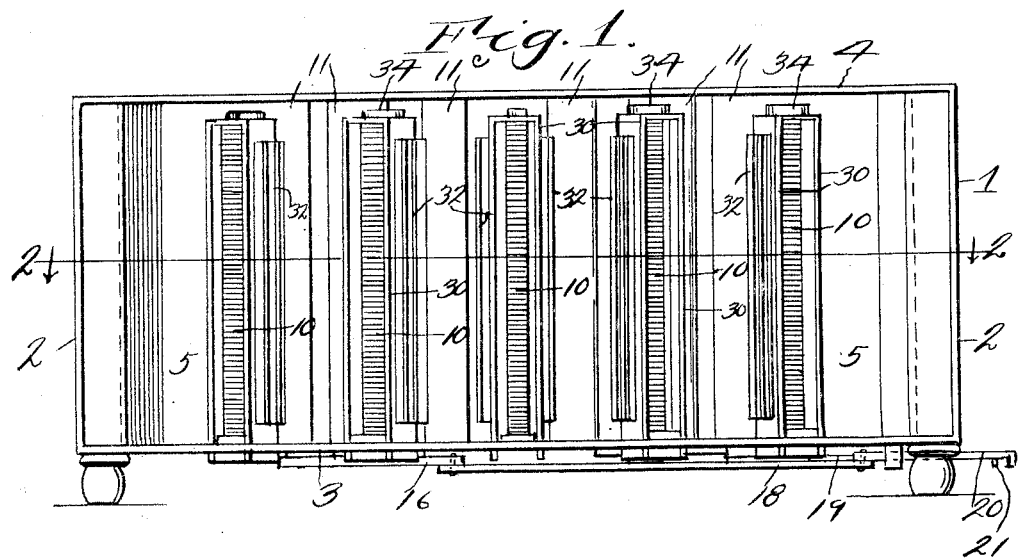
Figure 1 is a front elevation of the heater.

Referring to the drawings the numeral 1 designates the casing of the device, 2 the end walls, 3 the bottom and 4 the top walls. Disposed between the bottom and tops 3 and 4 are rearwardly converging plates 5, which have disposed in the rear open end 6 thereof an electrically driven fan 7. The fan 7 is driven by a conventional form of motor 8 and the fan and motor positioned whereby air will be sucked through the opening 9 in the rear of the casing 1. The forward diverging walls 5 terminate at the forward end of the casing in a manner whereby the heated air will be discharged into the atmosphere over a relatively large area. Secured to the bottom 3 of the casing in radial arrangement are vertically disposed electrical heating elements 10, over which currents of air pass as they are forced forwardly by the fan 7. It has been found that it is necessary to provide damper means for controlling the flow of air from the fan to the heating elements, and also shields around the heating elements at their rear sides to prevent the too rapid cooling of the heating elements as well as to control the amount of air heated, and to accomplish this result arcuate shaped pivoted dampers 11 are provided, rearwardly of the heating elements, and which dampers are in two series and move in opposed relation.

Figure 2:
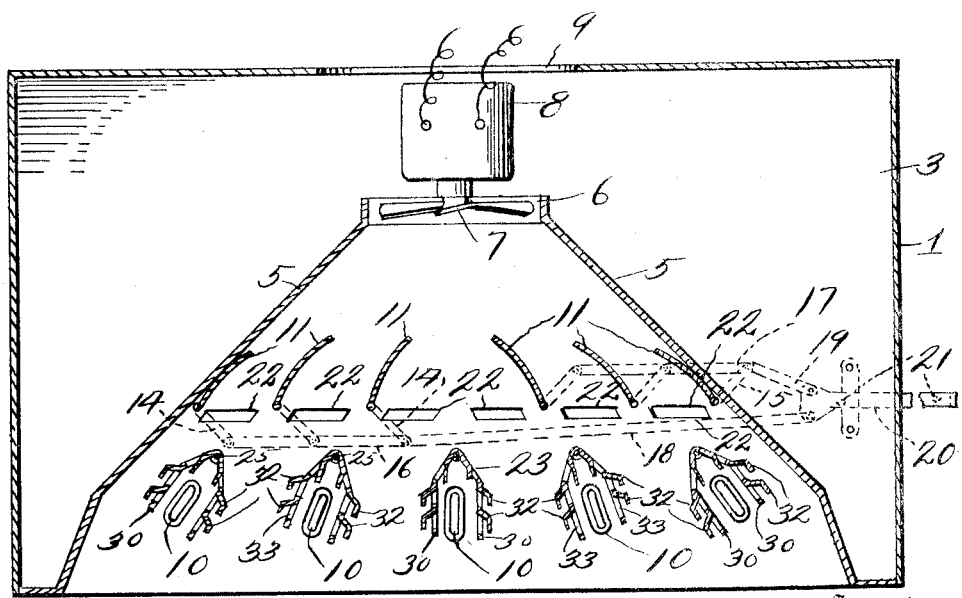
Figure 2 is a horizontal sectional view through the heater taken on line 2—2 of Figure 1, showing the heating elements and shields in top plan.

Dampers 11 are pivotally mounted at 12 in the bottom 3 and the top 4 of the casing, as clearly shown in Figure 6, however their lower pintles 13 extend through the bottom 3 and have connected thereto arms 14 and 15, which extend to opposite sides of the pintles as clearly shown in Figure 3. The arms 14 are connected together by a link 16, and the arms 15 by the link 17, and it will be seen that when said links 16 and 17 are moved longitudinally in the same direction, each series of dampers 11 will move towards or away from each other, thereby allowing a complete control of the air currents from the fan 7. By having the vanes curved as shown in Figure 2, it will be seen that the air currents will be deflected towards the heating elements 10. Connected to the links 16 and 17 are rods 18 and 19, which in turn are pivotally connected to the slide bar 20, slidably mounted on the under side of the bottom 3 of the casing, therefore it will be seen that all of the dampers can be controlled by the single slide bar 20. Bar 20 is preferably provided with stops 21 for limiting the longitudinal movement of the bars at the extreme open and closed damper positions.

It has been found, for efficient heating when the dampers are closed, it is necessary to admit air rearwardly of the heating elements 10, and forwardly of the dampers. To accomplish this result the bottom 3 is provided with apertures 22, through which air may pass. It has also been found that if the air blast from the fan is directly on the heating elements 10, the rear sides of said elements do not heat properly, and to overcome this difficulty shields 23 are provided which arch the rear sides of the heating elements and have their rear sides V-shaped as clearly shown in Figure 2.

Each shield 23, at its rear V-shaped side, is provided with struck in bearing members 24 forming one side of the bearing for receiving the bolt 25, which secures the shield to the bottom 3 of the casing. The forwardly diverging walls 26 having inwardly struck vanes 27 which protect the rear side of the heating element 10, and at the same time, when inwardly struck, form air ports 28, through which air passes into engagement with the heating element. The shield walls 26 may be provided with additional air ports 29 which will allow entrance of additional air to the heating element. Struck outwardly from the opposite parallel walls 30 of the shield are vertical vanes 32, which deflect the heated air forwardly after it has passed through the vertical openings 33 in the walls 30, therefore it will be seen that all air that enters each casing will be heated by the heating elements and will be discharged forwardly from the casing. The upper end of each casing is provided with an upwardly struck recess portion 34 which receives the upper end of the heating element 10, which recessed portion, in combination with the screws 35 securing the lower end of the heating element to the bottom 3, forms a rigid support for the heating element.

From the above it will be seen that a heating device is provided wherein controlled amounts of air may be directed over electrical heating units for heating the air. It will also be seen that damping means is provided for regulating the amount of air allowed to pass over the heating element, and shields are provided for the heating elements, through which the air passes for heating purposes, and that the shields shield the rear sides of the heating elements for preventing the too rapid cooling of the heating elements at their rear sides.

The invention having been set forth what is claimed as new and useful is:—

1. A heating device comprising a casing, heating elements in said casing, shields arching the rear sides of said elements, two series of vertically disposed hinged dampers rearwardly of the shields, a sliding control lever carried by the casing, arms carried by the dampers, connecting rod connections between the arms and link connection between the connecting rods and the sliding control lever and forming means whereby when the lever is moved in opposite direction the two series of dampers will also move in opposite direction to open or closed positions.

2. A heating device comprising a casing, heating elements in said casing, means for directing a current of air through the casing towards the heating elements, shields arching the rear sides of the heating elements, said shields being provided with forwardly extending vanes struck out from the shields, thereby forming means for admitting air to the heating elements and directing the air forwardly.

3. The combination with a heating device having heating elements in a casing and means for directing currents of air against one of the sides of the heating elements, of shields arching the sides of the heating elements towards the currents of air, said shields having walls extending to opposite sides of the heating elements and struck out vanes carried by the shields thereby forming air admission and exit passages and means for directing the currents of air heated by the elements forwardly.

4. The combination with a heating element against which currents of air are directed, of a shield arching the side of the heating element against which the currents of air are engaged, said shield being U-shaped in horizontal cross section, the flanges of the shield being disposed at opposite sides of the heating element and struck-out vanes vertically disposed and carried by the shield and forming air current directing means and openings through which air may enter the shield for engaging with the heating element.

5. The combination with a heating element disposed on a base, of a shield for said heating element, said shield comprising a rear wall arching the rear side of the heating element, side walls at opposite sides of the heating element, inwardly struck vanes carried by the rear wall thereby forming air entrance ports and deflecting means for deflecting air currents to the opposite sides of the heating element, struck out vanes carried by the opposite walls of the shield and means for anchoring the shield to the base.

6. A device as set forth in claim 5 wherein the anchoring means comprises members carried by the side walls and extending into the base and a bolt extending through the rear wall and anchored to the base.

GEORGE LEROY JESSUP.